(12) United States Patent
Tung et al.

(10) Patent No.: US 6,687,344 B1
(45) Date of Patent: Feb. 3, 2004

(54) PARALLEL HANDSET ON-HOOK/OFF-HOOK DETECTION BY SOFTWARE-BASED SIGNAL POWER MEASUREMENT

(75) Inventors: Chien-Cheng Tung, Fremont, CA (US); XiaoHua Luo, San Jose, CA (US); Anthony L. Mazzarini, San Jose, CA (US)

(73) Assignee: PCTEL,Inx., Chicago, IL (US)

( * ) Notice: Subject to any disclaimer, the term of this patent is extended or adjusted under 35 U.S.C. 154(b) by 94 days.

(21) Appl. No.: 09/949,342

(22) Filed: Sep. 7, 2001

(51) Int. Cl.$^7$ .............................................. H04M 11/00
(52) U.S. Cl. .................................... 379/93.09; 379/377
(58) Field of Search .......................... 379/93.05–93.07, 379/93.09, 93.11, 93.37, 106.08, 100.15, 399.01, 377

(56) References Cited

U.S. PATENT DOCUMENTS

| | | | | |
|---|---|---|---|---|
| 4,392,023 | A | 7/1983 | Sears ....................... | 179/2 DP |
| 4,686,699 | A * | 8/1987 | Wilkie ...................... | 379/93.05 |
| 4,742,536 | A | 5/1988 | Dewenter et al. ............. | 379/97 |
| 5,422,939 | A * | 6/1995 | Kramer et al. ......... | 379/106.08 |
| 5,506,891 | A | 4/1996 | Brown ......................... | 379/97 |
| 5,678,059 | A | 10/1997 | Ramaswamy et al. ....... | 395/821 |
| 5,721,830 | A | 2/1998 | Yeh et al. ............... | 395/200.67 |
| 5,864,710 | A | 1/1999 | Sands et al. ................ | 395/825 |
| 5,940,459 | A | 8/1999 | Hsu et al. .................... | 375/377 |
| 6,005,676 | A | 12/1999 | Morimoto ................... | 358/442 |
| 6,005,923 | A | 12/1999 | Lee .......................... | 379/93.09 |
| 6,112,266 | A | 8/2000 | Yeh ............................ | 710/52 |
| 6,240,177 | B1 | 5/2001 | Guntzburger et al. ....... | 379/387 |

OTHER PUBLICATIONS

"Guidelines for WDM–based Software Modems," Jul. 9, 2001; 6 pages; www.microsoft.com/hwdev/modem/softmodem.htm.

AC '97 Frequently Asked Questions, Intel Corporation, 3 pages, www.intel.com/pressroom/archive/releases/pcacfaq.htm; Jul. 9, 2001.

"Recommendations for ICHx/AC'97 Audio, Motherboard and Communication and Network Riser,"; Intel Corporation, Aug., 2000; 10 pages.

"Tools and Techniques for Softmodem IHV/ISV Self–Validation of Compliance with PC99 Guidelines for Driver- –Based Modems," Revision 1.0; Jul. 7, 1998; Intel® Architecture Labs, Intel Corporation, 16 pages.

"A Brief Primer on Modems"; Aug. 16, 2001; 3 pages; www.larwe.com/technical/modems.html.

Pickering, Ashley, "G.Lite: Effect of Telephony Equipment on Line Insertion Loss"; ITU—Telecommunication Standardization Section Study Group 15; Waikiki, Hawaii, Jun. 29–Jul. 3, 1998; BT Laboratories, 10 pages.

Arora, Rakesh, "Voice Over IP: Protcols and Standards"; Ohio State University, 24 pages.

"Audio Codec '97," Rev. 2.2; Sep. 2000; Intel Corporation; 105 pages; at http://www.intel.com/pc–supp/platform/ac97/.

* cited by examiner

Primary Examiner—Wing Chan
(74) Attorney, Agent, or Firm—James E. Eakin

(57) ABSTRACT

A computer having a modem is programmed with software (also called a "on-hook/off-hook detector") that detects a change in status (e.g., on-hook or off-hook) of a device (e.g., a telephone having a handset) by measuring a change in the signal power of a signal flowing through a telephone line connecting the modem and the device. In particular, the computer programmed with the on-hook/off-hook detector detects a status of a telephone handset by measuring power of a reference signal and measuring power of an instantaneous signal on the connection and comparing these two measurements. The reference signal is a constant signal whose power does not change. Then, the computer programmed with the on-hook/off-hook detector is able to detect whether there has been a change in status of the telephone handset by comparing the detected status with a previous status of the telephone handset. The on-hook/off-hook detector may be executed in a central processing unit (CPU) of a computer or in a digital signal processor (DSP) of a modem.

31 Claims, 10 Drawing Sheets

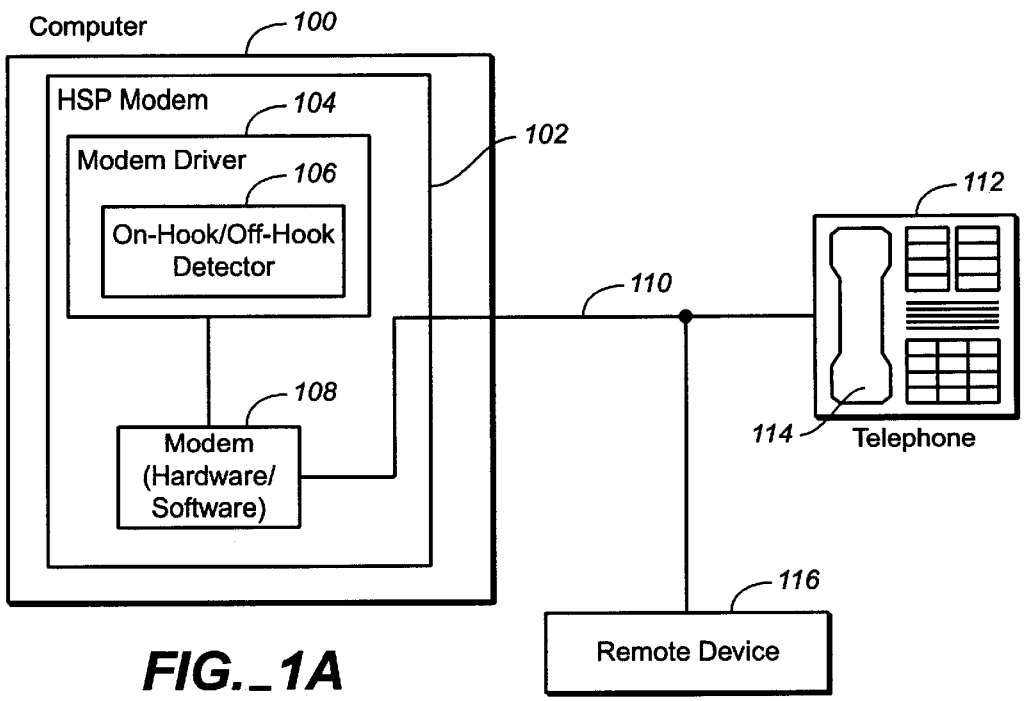
FIG._1A
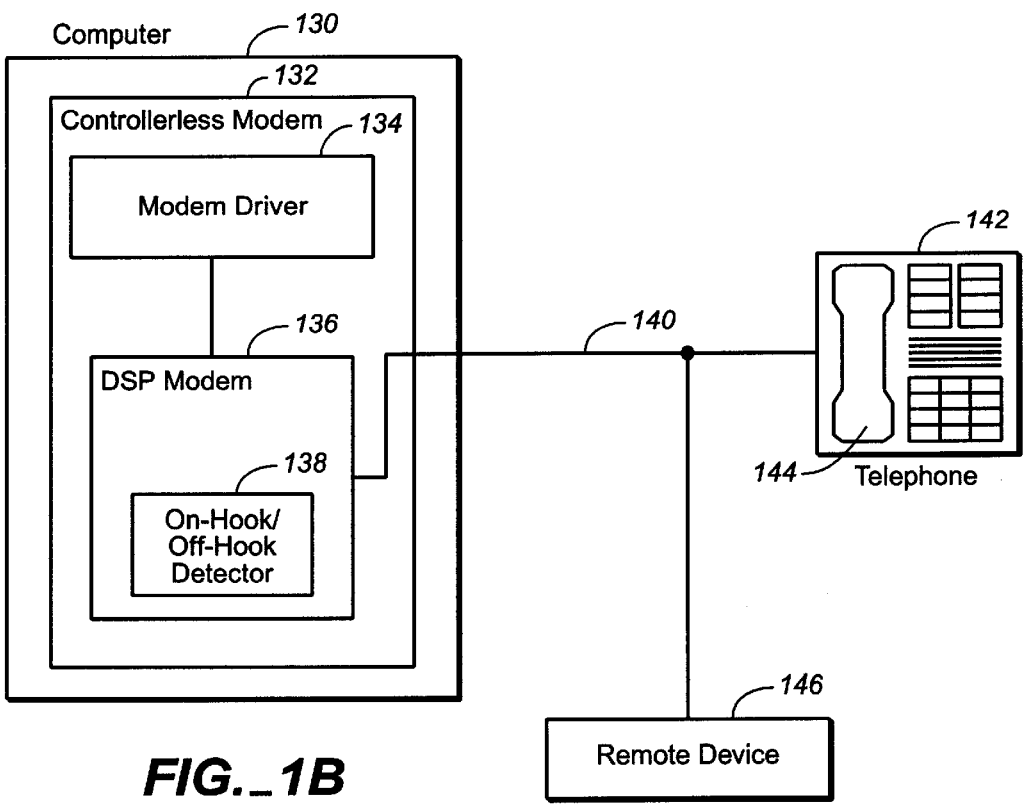
FIG._1B

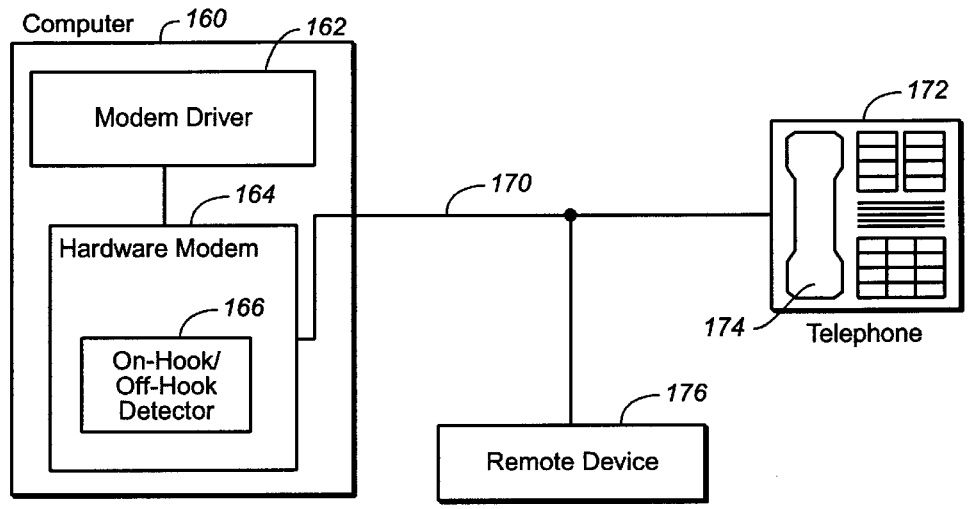
FIG._1C
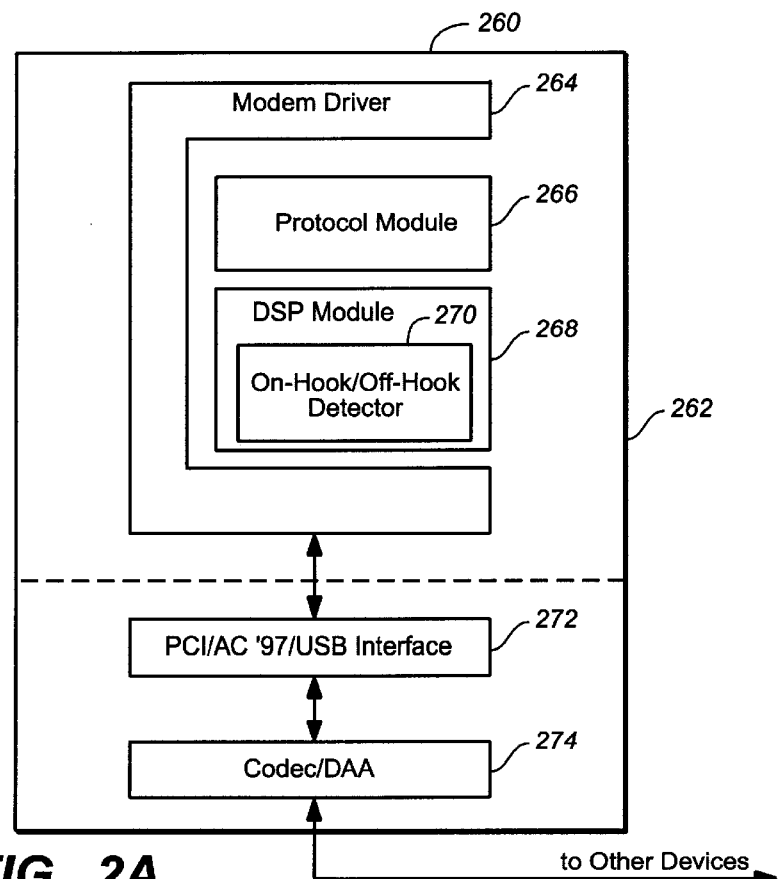
FIG._2A

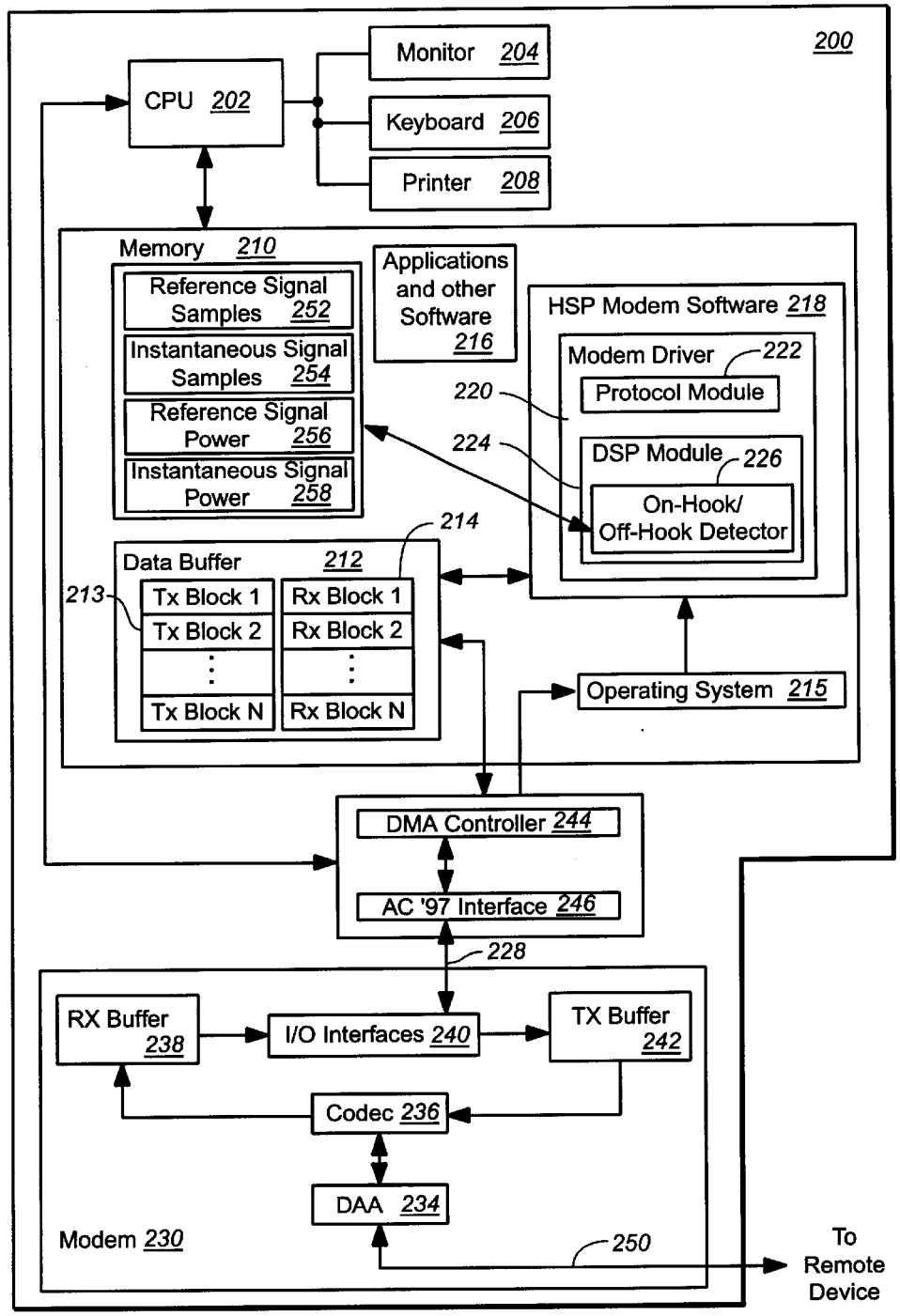
FIG._2B

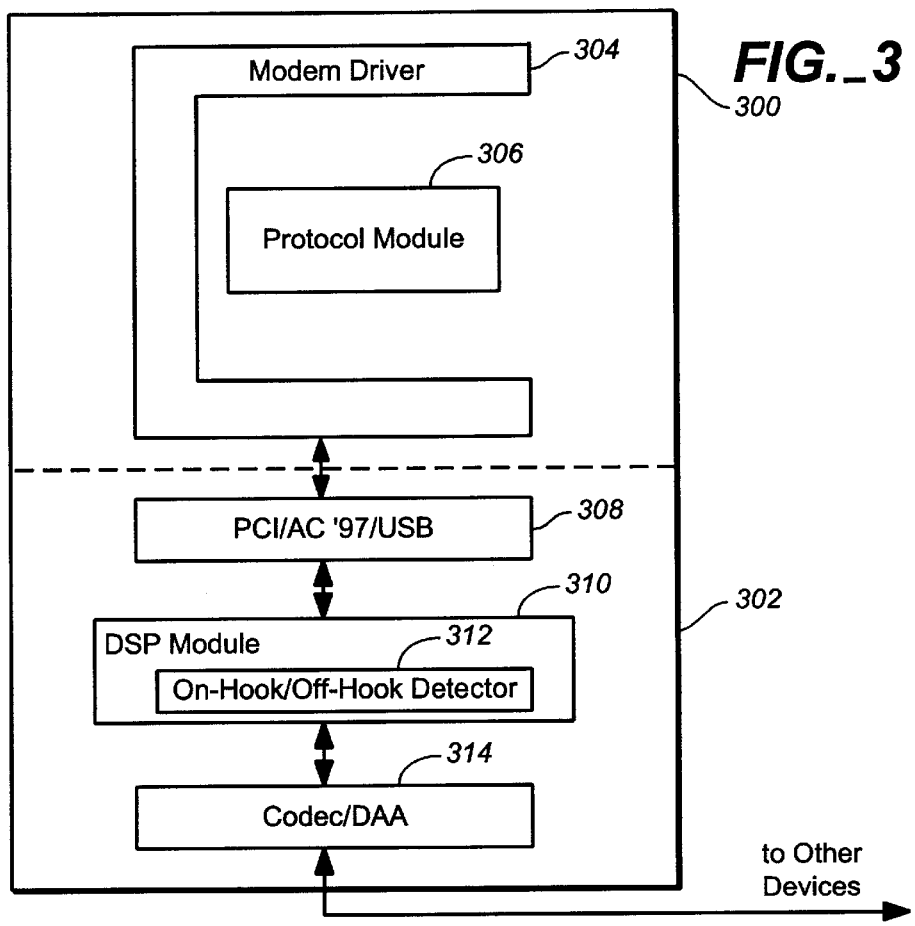
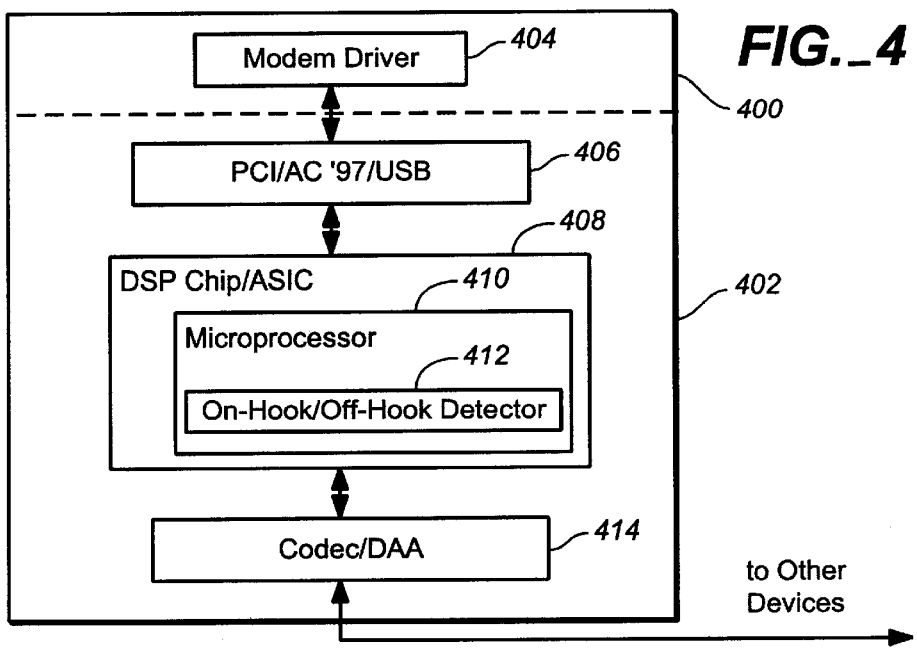

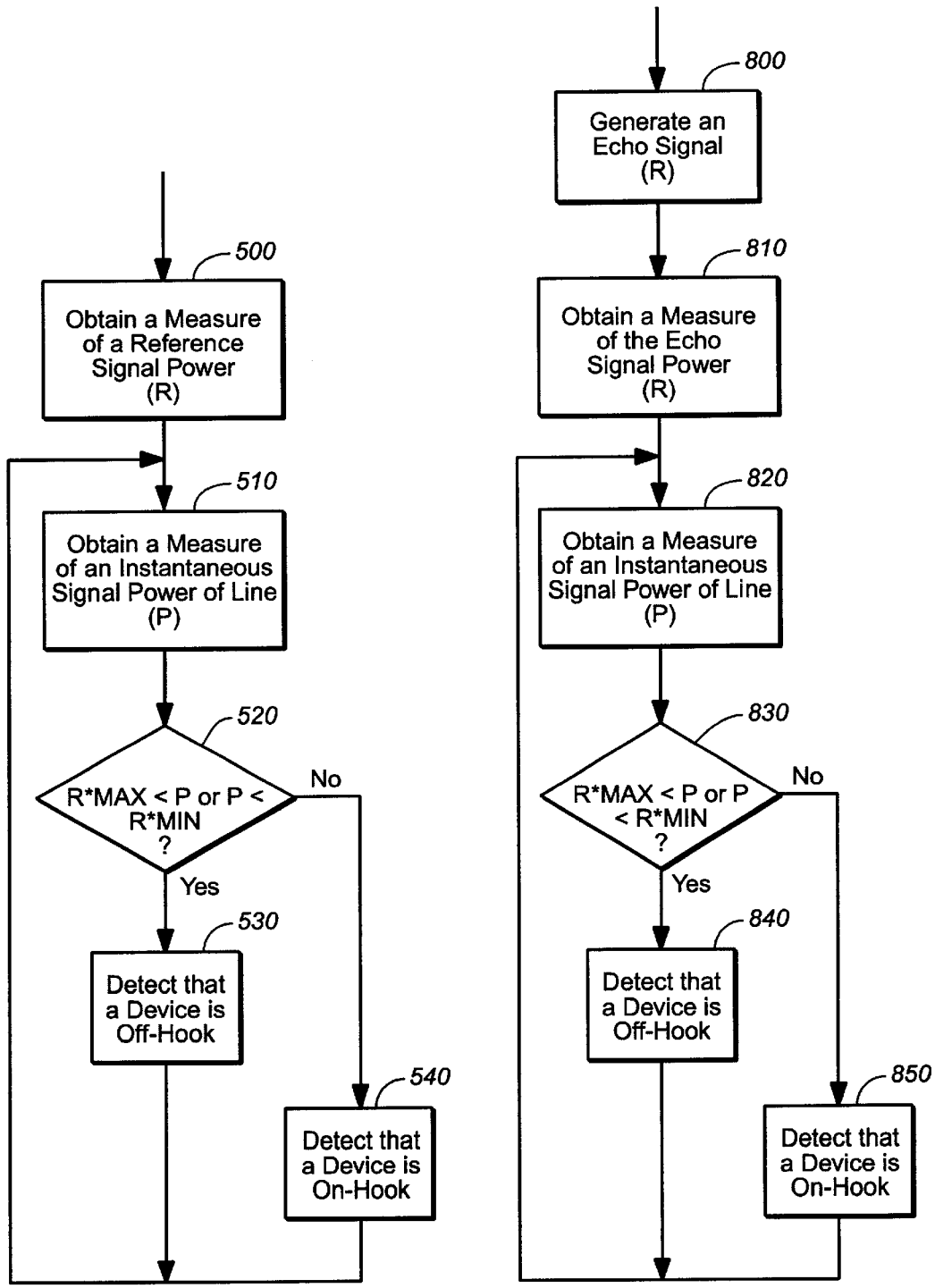
FIG._5     FIG._8

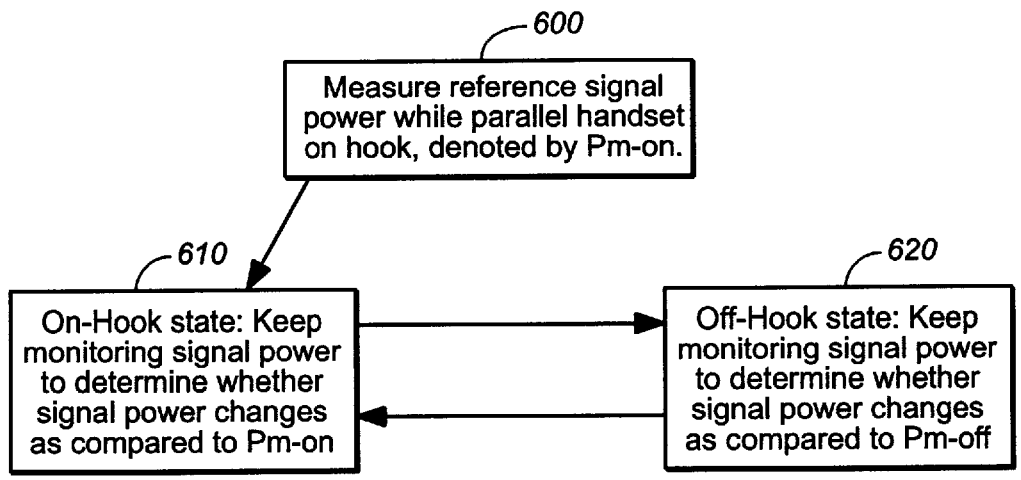
FIG._6
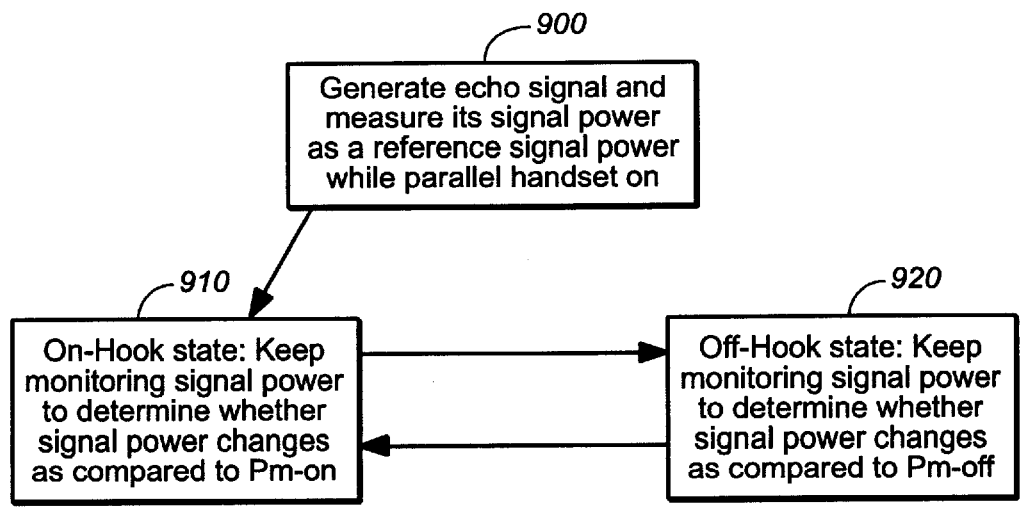
FIG._9

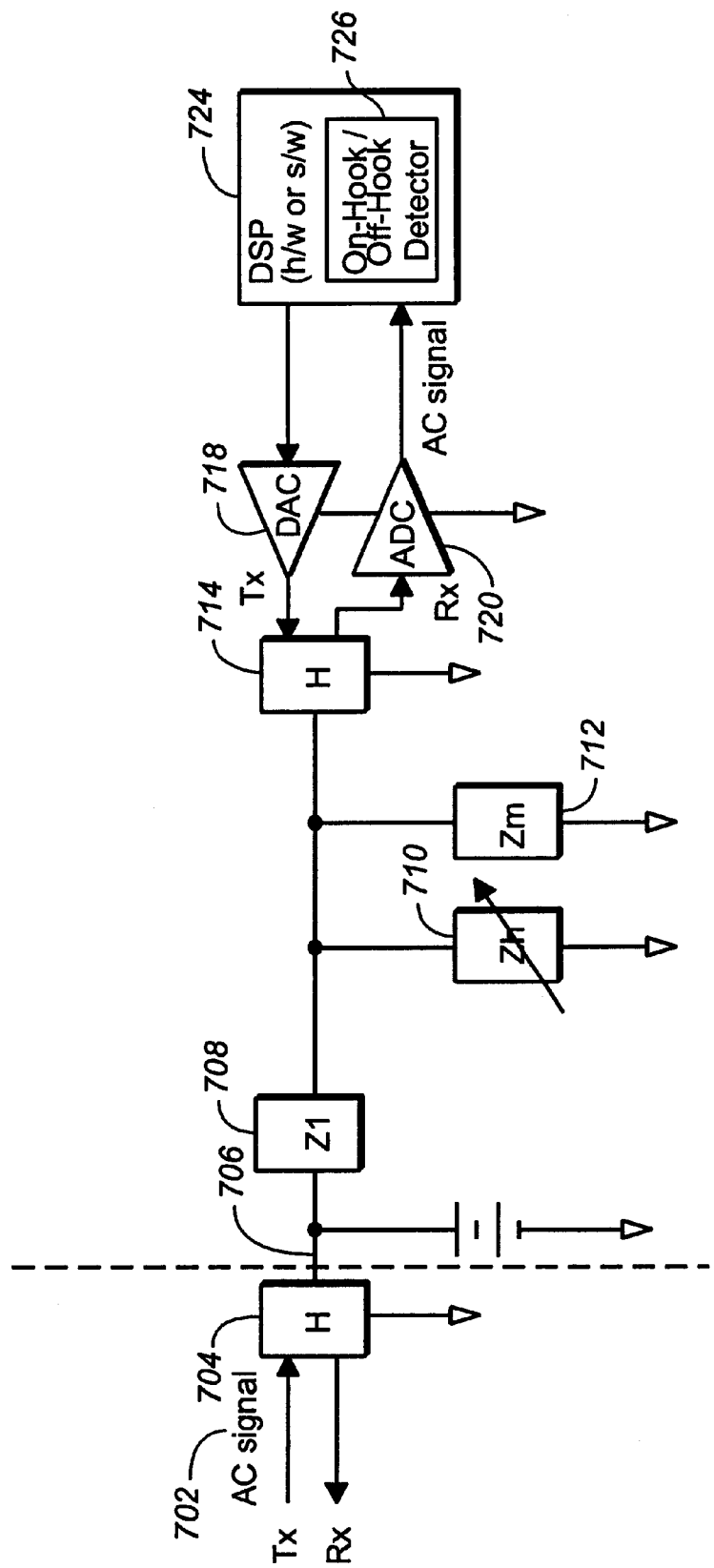
FIG._7

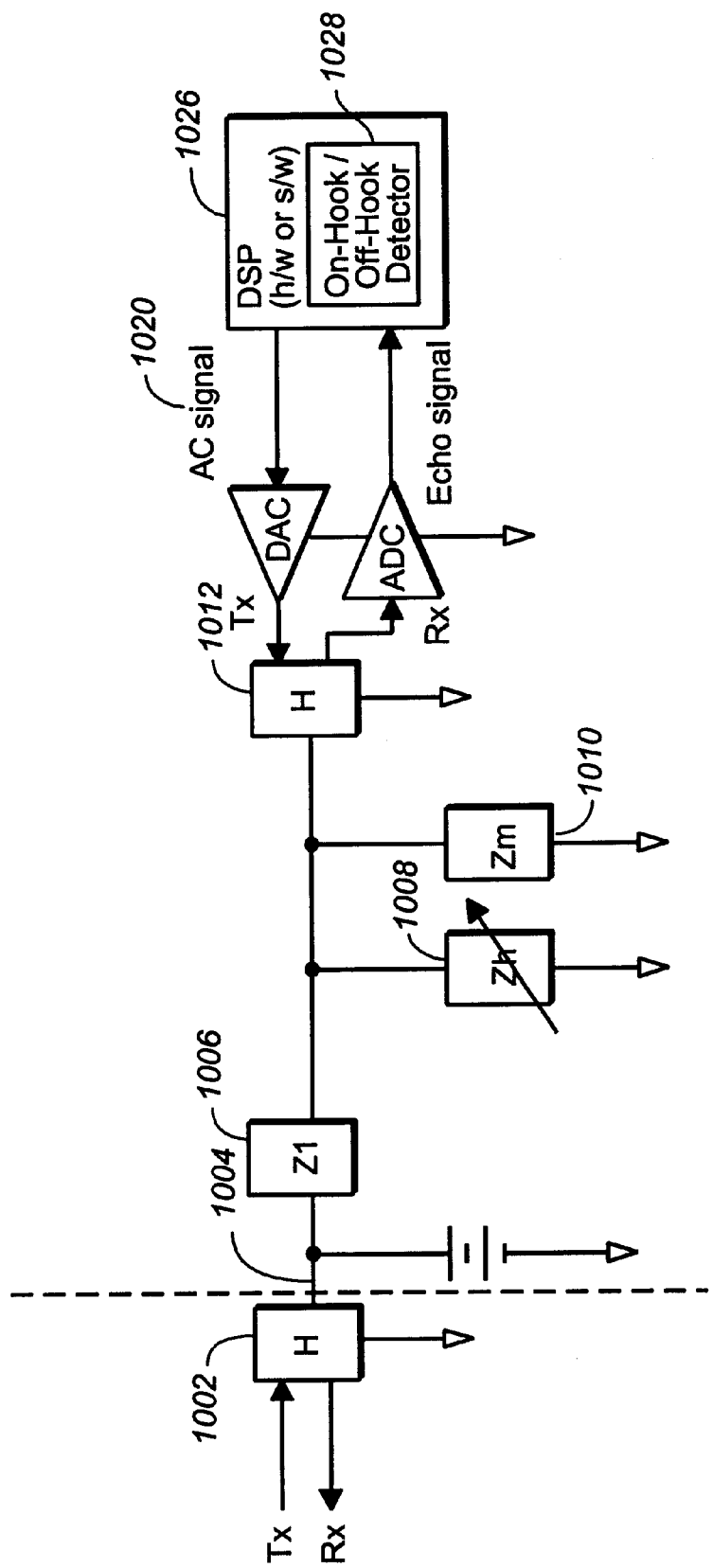
FIG._10

```
#define ONE_DB (1.2589f)
#define MINUS_ONE_DB (0.7943f)
#define REF_STABLE_COUNT 1000
typedef
enum {
        REF_STATE,
        ON_STATE,
        OFF_STATE
} ON_OFF_STATE;
typedef
enum {
        FALSE,
        TRUE
} Boolean;

// OnOffHookDetection - on/off hook detection subroutine
//          s: received sample
//          init: set TRUE to initialize
//          return TRUE for on-hook, return FALSE for off-hook Boolean OnOffHookDetection(float s, Boolean init)
{
        static float p, refp;
        static int count;
        static ON_OFF_STATE state;
        Boolean onhook;

// initialize on/off-hook detection
        if (init) {
                state = REF_STATE;
                count = 0;
                refp = 0;
                p = 0;
        }

// average power calculation
        p = p*0.99f + s*s*0.01f;
```

1100 — initialize block

1102 — average power calculation

FIG._11A

```
                switch (state) {
                case REF_STATE:
                            // save reference power after enough samples (here select 1000)
                            if (++count > REF_STABLE_COUNT) {
    1104                              refp = p;
                                      state = ON_STATE;
                            }
                            onhook = TRUE;
                            break;
                case ON_STATE:
                            // if current power is more than 1dB different from reference power,
                            // switch to off-state
                            if (p>ONE_DB*refp || p<MINUS_ONE_DB*refp) {
    1106                              state = OFF_STATE;
                                      // report off-hook status
                            }
                            onhook = FALSE;
                            break;
                case OFF_STATE:
                            // if current power is less than 1dB different from reference power,
                            // switch to on-state
                            if (p<ONE_DB*refp && p>MINUS_ONE_DB*refp) {
    1108                              state = ON_STATE;
                                      // report on-hook status
                            }
                            onhook = TRUE;
                            break;
                default:
                            // do nothing
                            break;
                }
                return onhook;
```

FIG.—11B

PARALLEL HANDSET ON-HOOK/OFF-HOOK DETECTION BY SOFTWARE-BASED SIGNAL POWER MEASUREMENT

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

With the success of the World Wide Web and the Internet, data communication has become a part of daily life for many people. At the same time, voice communication and telephones still remain one of the most common techniques of communication. Understandably, sharing data and voice communication through the same media (e.g., telephone lines) has become an essential issue of Internet accessing techniques.

Different devices may share a copper twisted pair telephone line for transporting data and voice. For example, when a modem and a telephone share a telephone line, the modem transmits and receives computer data, while the telephone transmits and receives voice data.

There are two general approaches to address the sharing of data and voice communication through the same media. The first approach digitizes voice signals and treats voice signals as data (i.e., voice over Internet Protocol (IP)). The voice over IP approach transmits voice signals as digital packets using the Internet Protocol, rather than using protocols of the Public Switched Telephone Network (PSTN). This approach requires revolutionary change in the telephone infrastructure. More information about Voice over IP may be found, for example, in "Voice over IP: Protocols and Standards" by Rakesh Arora, available on the World Wide Web at cis.ohio-state.edu/~jain/cis788-, which document is entirely incorporated herein by reference.

The second approach is to design modems (i.e., voice band modems) that can coexist with telephones while sharing a telephone line to transmit computer data and voice data. Voice band modems follow, for example, V32, V34, V90, V92, G.lite, or G.dmt protocol standards, which are available for purchase from the International Telecommunication Union and each of which is entirely incorporated herein by reference.

One of the critical problems in this second approach is reliable detection of the on-hook/off-hook status of a telephone handset connected in parallel with a modem on the same telephone line. At any given time, either the modem or the telephone exclusively transmits or receives data. For example, when a user picks up a telephone handset to make or answer a telephone call, the telephone is said to be off-hook. When the telephone handset is off-hook, voice data is being transmitted or received over the telephone line, and the modem cannot transmit or receive data. When the user places the handset back on the telephone, the telephone is said to be on-hook. At this time, the modem can transmit or receive data. Similarly, if a modem is transmitting or receiving data, the modem is said to be off-hook, and when the modem is not transmitting or receiving data, the modem is said to be on-hook. While the modem is off-hook, a user may not be able to make or answer a telephone call.

One technique for detecting the status of a parallel-connected telephone handset measures the change in the direct current (DC) line current. For more information, see U.S. Pat. No. 6,240,177 B1 (the '177 patent), entitled "Communication Device Comprising an Off-Hook Detection Circuit," issued on May 29, 2001 to Guntzburger et al. The '177 patent describes a communications device (e.g., a modem) that is connected in parallel with at least one item of communications apparatus (e.g., a telephone handset) on a transmission line. (Abstract; Col. 3, lines 25–30) The strength of the DC component of the current flowing in a modem is monitored. (Col. 4, lines 20–22) A variation of the current strength is detected when the item of apparatus connected to the transmission line is unhooked. (Col. 4, lines 22–25)

The change in DC current technique is a hardware-based solution. A disadvantage of this change in DC current technique is that the modem requires detection hardware or circuits, which limits the precision and flexibility of detection. For example, if a modem has a detector capable of detecting a 3 mA change in DC line current, the modem will fail to identify the on-hook or off-hook status of a handset if the handset changes the line current by less than 3 mA when going on-hook or off-hook. The precision of the line current detection can be enhanced to meet current sensing requirements when line loads change, but that could cause one hardware revision after another, which is expensive for the modem and creates upgrade or compatibility problems for modem owners.

Another technique for determining on-hook/off-hook status of parallel devices measures the changes in channel response. This is further described in "G.Lite: Effect of Telephony Equipment on Line Insertion Loss" by Ashley Pickering, presented to the ITU-Telecommunication Standardization Sector in Waikiki, Hi., Jun. 29–Jul. 3, 1998, which is entirely incorporated herein by reference. Disadvantages of this technique are the higher computational power required for periodically checking channel response and the complexity of interpreting the determined response to identify whether a parallel device is on-hook or off-hook.

SUMMARY

In accordance with an embodiment of the invention, a computer having a modem is programmed with software (also called a "on-hook/off-hook detector") that detects a change in status (e.g., on-hook or off-hook) of a device (e.g., a telephone having a handset) by measuring a change in the power of a signal flowing through a connection between the modem and the device. In one example, the computer programmed with the on-hook/off-hook detector detects a status of a telephone handset by obtaining a measure of a reference signal power and obtaining a measure of an instantaneous signal power on the connection and comparing these two measurements. The reference signal is a constant signal whose power does not change over time. Then, the computer programmed with the on-hook/off-hook detector is able to detect whether there has been a change in status of the telephone handset by comparing the detected ("instantaneous") status with a previous status of the telephone handset. The on-hook/off-hook detector may be executed in a central processing unit (CPU) of a computer or in a digital signal processor (DSP) of a modem.

BRIEF DESCRIPTION OF THE DRAWINGS

FIGS. 1A–1C illustrate, in block diagrams, various modems connected via a telephone line to a telephone.

FIGS. 2A–2B illustrate, in a block diagram, a software modem that includes an on-hook/off-hook detector in accordance with an embodiment of the invention.

FIG. 3 illustrates, in a block diagram a controllerless modem that includes an on-hook/off-hook detector in accordance with an embodiment of the invention.

FIG. 4 illustrates, in a block diagram, a hardware modem that includes an on-hook/off-hook detector in accordance with an embodiment of the invention.

FIG. 5 illustrates, in a flow chart, acts performed by a computer programmed in accordance with one embodiment of the invention to perform status detection when a constant source signal exists.

FIG. 6 illustrates, in a state diagram, various states of an on-hook/off-hook detector when there is a constant signal source in accordance with one embodiment of the invention.

FIG. 7 illustrates, in a schematic diagram, an AC model circuit in which there is a constant signal source in accordance with one embodiment of the invention.

FIG. 8 illustrates, in a flow chart, acts performed by a computer programmed in accordance with one embodiment of the invention to perform status detection where a constant source signal does not exist.

FIG. 9 illustrates, in a state diagram, various states of an on-hook/off-hook detector when there is no constant signal source in accordance with one embodiment of the invention.

FIG. 10 illustrates, in a schematic diagram, an AC model circuit in which a constant signal source does not exist in accordance with one embodiment of the invention.

FIGS. 11A–11B illustrate pseudocode instructions for performing the processing of the on-hook/off-hook detector.

Use of the same reference symbols in different figures indicates similar or identical items.

DETAILED DESCRIPTION

In accordance with an embodiment of the invention, a computer having a host signal processing (HSP) modem is programmed with the on-hook/off-hook detector. In accordance with another embodiment, a controllerless modem is programmed with the on-hook/off-hook detector. In accordance with yet another embodiment, a DSP modem is programmed with the on-hook/off-hook detector. The modem programmed with the on-hook/off-hook detector detects the change of status (e.g., on-hook or off-hook) of a device (e.g., a telecommunication device, such as a telephone, facsimile machine, or another modem). The device is connected via a communication medium, such as a copper twisted pair telephone line, to the modem.

The on-hook/off-hook detector detects the change of status of a connected device by measuring a change in signal power flowing on the medium and through the modem. Signal power is a function of a measured amplitude of a signal on a communication medium. In one embodiment (below), the on-hook/off-hook detector is implemented as an application program, and referred to as an on-hook/off-hook detector, although such software may be implemented at a lower level, e.g. as a driver. The terms "application" and "driver" are used to specify software instructions. These terms denote different embodiments of the invention, as used in this specification. Applications execute under the control of an operating system and cause the computer to perform the desired functions described herein. Drivers form a part of the operating system and make these functions available to applications.

The change in signal power technique of the invention is software-based and measures a change in signal power of AC signals.

FIGS. 1A–1C illustrate, in block diagrams, various modems connected via a telephone line to a telephone. In particular, a computer is provided with a modem. For example, the modem may be a host signal processing modem (HSP) (FIG. 1A), a controllerless modem (FIG. 1B), or a hardware modem (FIG. 1C). Each of these modems is a type of communication device.

FIG. 1A illustrates, in a block diagram, a computer 100 having an HSP modem 102 connected via a telephone line 110 to a telephone 112. An HSP modem is described in U.S. Pat. No. 5,721,830, entitled "Host Signal Processing Communication System that Compensates for Missed Execution of Signal Maintenance Procedures," issued Feb. 24, 1998 to Yeh et al., and U.S. Pat. No. 6,112,266, entitled "Host Signal Processing Modem Using a Software Circular Buffer in System memory and Direct Transfers of Samples to Maintain a Communication Signal," issued Aug. 29, 2000 to Yeh, each of which is entirely incorporated herein by reference. With the HSP modem, the computer's processing power and memory are used to house and execute software to perform functions that would be performed by hardware in a hardware modem. One example of an HSP modem is PCT1888, which is available for purchase from PCTEL, Inc. In one embodiment, the modem is an internal modem, and in other embodiments, the modem may be an external modem.

For more details on software modems, also see "Guidelines for WDM-based Software Modems" on the World Wide Web at Microsoft.com/hwdev/modem/ softmodem-.htm; "Tools and Techniques for Softmodem IHV/ISV Self-Validation of Compliance with PC 99 Guidelines for Driver-Based Modems," Revision 1.0, Intel® Architecture Labs, Intel Corporation, Jul. 7, 1998; and U.S. Pat. No. 5,678,059, entitled "Technique for Time-Sharing a Microprocessor Between a Computer and a Modem," issued Oct. 14, 1997 to Ramaswamy et al.; and each of these documents is entirely incorporated herein by reference.

The HSP modem 102 includes a software portion (modem driver 104) and a hardware portion (modem 108). The modem driver 104 includes an on-hook/off-hook detector 106. The modem 108 may include hardware or a combination of hardware and software. Modem 108 and telephone 112 are connected in parallel to remote device 116. The on-hook/off-hook detector 106, when performed by the computer 100, detects whether the telephone handset 114 is on-hook or off-hook. The telephone line 110 is connected to a remote device 116.

An HSP modem is one type of communication device that uses a central processing unit (CPU) in a computer to perform digital signal processing (DSP) tasks that are normally performed by hardware in hardware modems. For an HSP modem, the computer executes software that performs at least some of the processing traditionally performed by hardware in a hardware modem. The HSP modem has a hardware portion, which, for example, may perform simple analog-to-digital and digital-to-analog conversions. The HSP modem also has a software portion that includes an on-hook/off-hook detector. The computer's processing power and memory are used to perform and house the on-hook/off-hook detector.

FIG. 1B illustrates, in a block diagram, a computer 130 having a controllerless modem 132 connected via a telephone line 140 to a telephone 142. A controllerless modem is described in U.S. Pat. No. 5,864,710 and in "A Brief Primer on Modems" by Lewin A. R. W. Edwards available on the World Wide Web at larwe.com/technical/ modems.html, and each document is entirely incorporated herein by reference. With the controllerless modem, a digital signal processor (DSP) is provided on an expansion card with direct links to the computer. The computer includes a driver for supervising the DSP. In one embodiment, the modem is an internal modem, and in other embodiments, the modem may be an external modem.

The following are some controllerless modems that are available for purchase: a Netcomm 56K Internal V90 Hardware Controlless Modem using a 1646 chipset from Lucent Technologies; the Acorp M-56PML, 56 k, Internal, Controlless, Linux Ready modem using the 1646 chipset from Lucent Technologies; or a LAN/HCF modem from Conexant Systems, Inc.

The controllerless modem 132 includes a software portion (modem driver 134) and a hardware portion (DSP modem 136). The DSP modem 136 includes an on-hook/off-hook detector 138. The DSP modem 136 may include hardware or a combination of hardware and software. DSP modem 136 and telephone 142 are connected in parallel to remote device 146. The on-hook/off-hook detector 138, when performed by the DSP modem 136, detects whether the telephone handset 144 is on-hook or off-hook. The telephone line 140 is connected to remote device 146.

FIG. 1C illustrates, in a block diagram, a computer having a hardware modem connected via a telephone line to a telephone. In one embodiment, the modem is an internal modem, and in other embodiments, the modem may be an external modem. The following are some hardware modems available for purchase: the Combo (V90 LAN) modem from Conexant Systems, Inc. In a hardware modem, hardware performs signal processing tasks.

The hardware modem 164 works with modem driver 162. The hardware modem 164 includes an on-hook/off-hook detector 166. The modem 164 may include hardware or a combination of hardware and software. Modem 164 and telephone 172 are connected in parallel to remote device 176. The on-hook/off-hook detector 166, when performed by modem 164, detects whether the telephone handset 174 is on-hook or off-hook. The telephone line 170 is connected to remote device 176.

The hardware may be in the form of ASIC chipsets (i.e., a chip designed for a special application) or Digital Signal Processing (DSP) chips). A DSP circuit in the hardware modem includes software. In some systems, software (e.g., the on-hook/off-hook detector) initially on the hard drive of the computer is downloaded to the DSP circuit of the modem.

In one embodiment, the on-hook/off-hook detector detects whether there has been a change in status by comparing the instantaneous status to a previous status of a connected device.

To detect the instantaneous status, the on-hook/off-hook detector at the modem measures a reference signal power (e.g., a constant signal source such as an AC source), measures an instantaneous signal power of the telephone line, and compares these two. In one embodiment, the on-hook/off-hook detector detects whether or not the difference between the reference signal power and the instantaneous signal power is approximately 1 dB. The 1 dB value was identified by experimentation, and, in other embodiments, the difference may be smaller or larger than 1 dB. For the embodiment in which the 1 dB value is used, the signal power is measured by the following equation (1):

$$P_n = P_{n-1} * 0.99 + S_n^2 * 0.01 \quad (1)$$

In equation (1), $P_n$ represents an instantaneous signal power. $P_{n-1}$ represents a previously measured signal power. Initially, $P_{n-1}$ is zero. $S_n$ represents a measure of current or voltage. Typically, a codec will measure the amplitude of the signal's current or voltage. Equation (1) is referred to as first order recursive averaging. That is, the signal power is measured by taking a portion (e.g., 0.99) of the previously measured signal power and adding it to a measure of current or voltage that is squared and multiplied by a value (e.g., 0.01). Equation (1) may also be used to calculate a reference signal power by measuring signal current or voltage at some point in time.

Noise distribution and the range selected to determine the on-hook/off-hook status change affect how many samples are required before the power measurement is stable. The number of samples required to reach stability is C/w, where C is a small integer, such as 10, and w is the value 0.01 (i.e., the constant that is multiplied with $S_n^2$ from equation (1). The value of 10 for C was determined based on experimentation, and C may take on other values in other embodiments. If C is 10 and w is 0.01, then 1000 samples are required to obtain a stable power measurement.

In another embodiment, if a value other than 1 dB is used, then the 0.99 and 0.01 values would be modified accordingly. For example, if a delta of 0.5 dB were used, then 0.99 would be replaced by 0.999 and 0.01 would be replaced by 0.001, resulting in the following equation (2):

$$P_n = P_{n-1} * 0.999 + S_n^2 * 0.001 \quad (2)$$

Alternatively, the signal power may be measured by the following equation (3):

$$P_n = 1/100 \sum_{i=n-99}^{n} S_i^2 \quad (3)$$

Equation (3) represents an embodiment in which a 100 sample buffer is used. $P_n$ represents an instantaneous signal power. An average signal power is obtained for signal power values ranging from $S_0 \ldots S_{99}$.

Any equation that can be used to differentiate impedance can be used with the techniques of the invention. Only a few sample equations ((1), (2), and (3)) have been provided as the list of possible equations is too extensive to identify herein. For example, any of the equations ((1), (2), or (3)) may use absolute values (e.g., |S|).

The on-hook/off-hook detector next determines a range based on the reference signal power. If an instantaneous signal power exceeds the range, then the on-hook/off-hook detector detects that a connected device is off-hook. If the instantaneous signal power falls within the range, then the on-hook/off-hook detector detects that a connected device is on-hook. In one embodiment, the range is determined with equation (4) as follows:

$$R*MIN < P < R*MAX \quad (4)$$

P represents the instantaneous signal power on the line, and R represents the reference signal power. MIN represents a minimum threshold (e.g., 0.7943), and MAX represents a maximum threshold (e.g., 1.2589). The example values of MIN and MAX were identified by experimentation, and it is to be understood that other values may be used. In particular, if P falls within the range, a device connected to a modem is determined to be on-hook. If P falls outside of the range, a device connected to a modem is determined to be off-hook.

If the on-hook/off-hook detector detects that the telephone handset is within the range (i.e., it is on-hook) and subsequently detects that the telephone handset is outside of the range (i.e., it is off-hook), the on-hook/off-hook detects a change of status of the telephone handset from on-hook to off-hook. Likewise, if the on-hook/off-hook detector detects that the telephone handset is outside of the range (i.e., it is off-hook) and subsequently detects that the telephone handset is within the range (i.e., it is on-hook), the on-hook/off-hook detects a change of status of the telephone handset from off-hook to on-hook.

In an alternative embodiment, the on-hook/off-hook detector determines whether there has been a change in status of another device on the line if the difference (i.e., delta change) between the reference signal power and measured signal power exceeds a predetermined threshold (e.g., 1 dB). The difference is an incremental change and may be either positive or negative. In one embodiment, if the modem is off-hook and the handset goes off-hook, the signal power over the modem decreases, and the difference is a negative value. If the modem is off-hook and the handset goes on-hook, the signal power over the modem increases, and the difference is a positive value.

FIGS. 2A–2B illustrate, in block diagrams HSP modems that include an on-hook/off-hook detector in accordance with embodiments of the invention.

FIG. 2A illustrates, in a block diagram, components of a host signal processing (HSP) communication system. A software portion 260 and a hardware portion 262 are illustrated as being divided by a dashed line. The software portion 260 includes a modem driver 264, which wraps around a protocol module 266 and a DSP module 268. The protocol module 266 implements a communication protocol (e.g., the V90 protocol standard) by generating messages in accordance with the protocol. The DSP module 268 performs signal processing tasks traditionally performed by a digital signal processor. The DSP module 268 includes an on-hook/off-hook detector 270. The software portion 260 communicates with a codec/DAA 274 via a PCI/AC'97/ USB interface 272.

FIG. 2B illustrates, in a block diagram, a host signal processing (HSP) communication system in accordance with one embodiment of the invention.

Computer 200 includes HSP modem software 218 and a modem 230, in accordance with one embodiment of the invention. The modem 230 forms a hardware portion of the HSP modem, while HSP modem software 218 forms a software portion.

The computer 200 has a CPU 202, a memory 210, connected via a DMA controller 244, an AC '97 interface 246, and a bus 228 to modem 230. The memory 210 includes an operating system 215, applications and other software 216, and a data buffer 212. The memory also stores reference signal samples 252 in a first set of storage elements (e.g., an array or a linked list) and instantaneous signal samples 254 in a second set of storage elements (e.g., an array or a linked list). The memory further includes a reference signal power 256, which is determined using the reference signal samples 252, and an instantaneous signal power 258, which is determined using the instantaneous signal samples 254.

The computer 200 may include other devices or peripherals, such as a monitor 204, keyboard 206, and printer 208. Although a computer is illustrated, the techniques of the invention may apply to other devices, such as appliances or personal digital assistants (PDAs). Additionally, the software may be loaded from memory, data storage devices, and/or data communication devices into the memory 210 of the computer 200 for use during actual operations.

HSP modem software 218 includes a modem driver 220. The modem driver 220 includes a protocol module 222 (sometimes referred to as a controller module) and a DSP module 224. The DSP module includes on-hook/off-hook detector. The on-hook/off-hook detector of the invention has been added to detect a status change according to the change in signal power technique of the invention.

In one embodiment, CPU 202 executes software under supervision of an operating system 215, such as Microsoft® Windows XP, Microsoft® Windows® 2000, Microsoft® Windows® ME, or Linux®, and CPU 202 is a processor implementing an Intel386® or Intel486® instruction set. In one embodiment, computer system 200 is an IBM® personal computer compatible system, and bus 228 is a local bus such as an AC '97 bus. Depending on the embodiment interfaces other than AC '97 may be used, such as a Peripheral Component Interconnect (PCI) in the case of an internal modem or a Universal Serial Bus (USB) in the case of an external modem.

Regardless of the type of modem (hardware, controllerless, or software), the modem may interface to the CPU via a Modem Riser Audio Codec '97 (MR AC '97) solution, which uses a direct memory access (DMA) controller. A modem riser is a card with a codec and an AC '97 interface. AC '97 refers to a component specification that defines an audio architecture for a personal computer that enables high-quality audio. The AC '97 specification was developed jointly by Analog Devices, Inc., Creative Labs, Inc., Intel Corp., National Semiconductor Corp., and Yamaha Corp. Further information on this specification is available on the World Wide Web at intel.com/pc-supp/ platform/ac97/ in a document entitled "Audio Code '97 Component Specification v2.2," which document is entirely incorporated herein by reference. Additional information may be found in "Recommendations for ICHx/AC '97 Audio Motherboard and Communication and Network Riser", Revision 1.0, from Intel Corporation, August 2000, and on the World Wide Web site at intel.com/pressroom/ archive/releases/pcacfaq.htm", and each of these documents is entirely incorporated herein by reference.

In an embodiment of the invention, HSP modem software 218 is a custom device driver for an operating system. Commonly owned U.S. Pat. No. 5,940,459, entitled "Host Signal Processor Modem and Telephone", issued Aug. 17, 1999 to Hsu et al., which is hereby entirely incorporated herein by reference, describes an HSP modem driver in further detail.

In data buffer 212, the (HSP) modem maintains transmit (Tx) buffer 213 and receive (Rx) buffer 214. The transmit buffer 213 has multiple transmit buffer blocks (represented as buffer blocks 1–N). Likewise, the receive buffer 214 has multiple receive buffer blocks (represented as buffer blocks 1–N). In response to an interrupt from the DMA controller 244, CPU 202 executes modem software 218 to fill one of the transmit buffer blocks and read one of the receive buffer blocks.

Execution of HSP modem software typically occurs during periodic interrupts of the host CPU. U.S. Pat. No. 5,721,830 discusses interrupts at, for example, Column 1, lines 63–67 and Column 2, lines 1–9, and this entire patent is incorporated herein by reference.

Modem 230 communicates with a remote device, such as another modem (not shown) via telephone lines 250. A data access arrangement (DAA) 234 connects to telephone lines 250 and provides a Rx signal from telephone lines 250 to codec 236. Codec 236 transfers the Rx signal from DAA 234 to Rx buffer 238. The signal is stored in RX buffer 238 for transmission to Rx buffer blocks 214. Data stored in the Rx buffer 238 is routed via I/O interfaces 240, along local bus 228, and through AC '97 interface 246. The DMA controller 244 transfers the samples from Rx buffer 238 to receive buffer 214. These samples are processed by the CPU 202 and new samples are generated and stored in transmit buffer 213.

The DMA controller 224 transfers the samples from the transmit buffer 224 into the Tx buffer 242, via the AC '97 interface 246, along local bus 228, and through I/O interfaces 240. The TX buffer 242 stores data from Tx buffer blocks 213 for transmission to the remote device. Codec 236 transfers Tx samples from Tx buffer 242 to DAA 234 for transmission on telephone lines 250.

In one embodiment of the invention, DMA controller 244 is a conventional DMA controller chip such as an Intel® 810 or 820 (from Intel, Corp.), a Via™ 686A (from Via Technologies, Inc.), or a SiS™ 540 or 630 (from Silicon Integrated Systems, Corp.).

Buffers 238 and 242 may be components of the I/O interface chip or separate components. I/0 interfaces 240, codec 236, and DAA 234 may be components of an integrated circuit such as a PCT301, available from PCtel, Inc.

The series of digital samples in data buffer 212 represent in binary form amplitudes of an analog communication signal that comply with a communication protocol. The communication protocol employed in system 200 depends on communication link 250 and the remote device. Communication protocols are available for a great variety of applications including modems, facsimile machines, and video phones operating at various data rates. Examples of well known communication protocols include V32, V34, V90, and V92 protocol standards, which are specified by the International Telecommunication Union. More information on the standards is available for purchase from the International Telecommunication Union or may be found at the following World Wide Web (WWW) site: itu.int.

Transfers to and from data buffer 212 proceed directly between buffer 212 and device 230 without intervention of CPU 202. Specifically, 110 interfaces 240 in device 230 periodically request access to memory 210 for transfer of samples to or from data buffer 212. Transfers can be conducted, for example, according to the DMA channel or a similar high speed channel between device 230 and host computer 200.

Using the present specification, the invention may be implemented as a machine, process, or article of manufacture by using programming and/or engineering techniques to produce software, firmware, hardware, or any combination thereof.

Although a host signal processing (HSP) modem has been used for illustration, the change in signal power detection technique of the invention is applicable to other types of modems in alternative embodiments.

FIG. 3 illustrates, in a block diagram, a controllerless modem in accordance with one embodiment of the invention. A software portion 300 and a hardware portion 302 are illustrated as being divided by a dashed line. The software portion 300 includes a modem driver 304, which wraps around a protocol module 306. The protocol module 306 implements a communication protocol (e.g., the V90 protocol standard). The software portion 300 communicates with a DSP module 310 via a PCI/AC'97/USB interface 308. The DSP module 310 performs signal processing tasks. The DSP module 310 includes an on-hook/off-hook detector 312. Data from the DSP module 310 is transmitted to other devices via codec/DAA 314.

Unlike the HSP modem of FIG. 2A, the controllerless modem executes the on-hook/off-hook detector from a DSP module.

FIG. 4 illustrates, in a block diagram, a hardware modem in accordance with one embodiment of the invention. Computer 400 is programmed with modem driver 404. When modem driver 404 is executed, it supervises DSP 408 via a PCI/AC'97/USB interface 406. The DSP 408 may be a DSP chip or an application specific integrated circuit (ASIC). DSP 408 includes a microprocessor 410. The microprocessor 410 is programmed with an on-hook/off-hook detector 412. Signals and transmitted to and received from other devices via codec/DAA 414.

In contrast to the conventional configuration in which the detection of whether the handset is on-hook or off-hook is performed by hardware based on a DC signal, the change of signal power technique detects the status of the handset using software and based on an AC signal.

The change in signal power technique is applicable whether or not a constant signal source (i.e., a source of a signal that does not change over time) on line exists.

The processing of an on-hook/off-hook detector when a constant signal source exists is illustrated in a flow chart in FIG. 5 in accordance with one embodiment of the invention. Act 500 represents the on-hook/off-hook detector obtaining a measure of a reference signal power, represented with "R". The value of each sample is provided by the codec. The reference signal power is from an AC source (e.g., the transmit signal from a remote modem). In one embodiment of the invention, the reference signal power is sampled one thousand times, at which point it is considered to be stable. The reference signal power is then set to, for example, an average value of the thousand samples. The reference signal power is calculated when the modem is off-hook and has connected to a remote modem. The instantaneous signal power is measured, in one embodiment, with equation (1).

Act 510 represents the on-hook/off-hook detector obtaining a measure of the instantaneous signal power (represented with "P") of the line connecting the modem to another device (e.g., the telephone handset). The modem is off-hook at this point and the telephone handset is on-hook. The on-hook/off-hook detector monitors the signal power of the line to determine whether the telephone handset moves from an on-hook status to an off-hook status. As discussed above, the instantaneous signal power is measured, in one embodiment, with equation (1).

Act 520 represents the on-hook/off-hook detector determining whether the instantaneous signal power falls outside of a range. If the instantaneous signal power falls within a range (e.g., within 1 dB of the reference signal power), then the connected device is on-hook, otherwise, it is off-hook. In particular, the on-hook/off-hook detector determines whether equation (4) is true.

P is the instantaneous signal power on the line, and R is the reference signal power. MIN represents a minimum threshold (e.g., 0.7943), and MAX represents a maximum threshold (e.g., 1.2589). The example values of MIN and MAX were identified by experimentation, and it is to be understood that other values may be used. If the instantaneous signal power is less than R*MIN or greater than R*MAX, the on-hook/off-hook detector continues to act 530, otherwise, the on-hook/off-hook detector continues to act 540.

In an alternative embodiment, the on-hook/off-hook detector compares the instantaneous signal power with the reference signal power and determines whether the difference between them exceeds a threshold, such as 1 dB. The 1 dB value was identified by experimentation. If the threshold is too large, there may be misdetection in that a difference that is relevant may not be detected. If the threshold is too small there may be false detection as noise may result in a difference being found. Additionally, in other embodiments, rather than a minimum threshold, a maximum threshold may be used. The threshold value may be different in different embodiments and may be affected, for example, by the type and number of devices connected in parallel with the modem.

Act 530 represents the on-hook/off-hook detector detecting that a device connected to the modem is off-hook. Act 540 represents the on-hook/off-hook detector detecting that a device connected to the modem is on-hook. After either act 530 or 540, the on-hook/off-hook detector loops back to act 510 and periodically measures the signal power until the modem is disconnected from the remote modem.

In one embodiment, the on-hook/off-hook detector performs monitoring of the status of the connected device by measuring every two samples for 200–300 samples to detect a change. Alternatively, the on-hook/off-hook detector may be configured to measure every other sample, every third sample, etc. for a different number of samples (e.g., 150, 400, etc.) as long as the sampling response time is good (e.g., measuring a few hundred samples takes less than 100 milliseconds).

In one embodiment, when a status change occurs, the on-hook/off-hook detector may transmit a signal to the CPU 202 to indicate the status change. If the status change indicates that the handset is off-hook, the CPU may cease transmitting data, thereby to allow a voice call to be placed via the handset in the normal manner. If the status change indicates that the handset is on-hook, the CPU may start transmitting data (or resume transmission if transmission was interrupted by such a status change).

FIG. 6 illustrates, in a state diagram, various states of an on-hook/off-hook detector when there is a constant signal source in accordance with one embodiment of the invention. State 600 represents an initial state in which the reference signal power is measured while a parallel handset is on-hook. There is a transition from state 600 to state 610 once the reference signal power is measured (i.e., some fixed N samples, such as 100, are taken). State 610 represents a state in which the parallel handset is in an on-hook state, and the on-hook/off-hook detector is monitoring the signal power to determine whether there is a change as compared to the reference signal power. Monitoring refers to calculating an instantaneous signal power and comparing it to the reference signal power to determine whether there is a change in signal power with respect to the signal power for the instantaneous status, which is on-hook. If there is such a change, the on-hook/off-hook detector detects that the parallel handset is off-hook and transitions from state 610 to state 620. In state 620, the parallel handset is in an off-hook state, and the on-hook/off-hook detector is monitoring the signal power to determine whether there is a change in signal power with respect to the signal power for the instantaneous status, which is off-hook. If there is such a change, the on-hook/off-hook detector detects that the parallel handset is on-hook and transitions from state 620 back to state 610.

FIG. 7 illustrates, in a schematic diagram, an AC model circuit in which there is a constant signal source in accordance with one embodiment of the invention. In this case, an AC signal 702 originates from a remote source (e.g., another modem at a central office). The AC signal 702 flows through transformer 704 onto line 706. Transformer 704 is typically located at a central office when following the V90 protocol standard. The AC signal 702 is a Tx signal from the remote source. The dashed line represents a separation of the remote source. The AC signal 702 travels on line 706 to transformer 714. The line impedance 708 is represented by Zl, the handset impedance 710 is represented by Zh, and the modem impedance 712 is represented by Zm. Impedance, which is typically denoted with Z, refers to the opposition that an electrical component provides an alternating current (AC). Zh 710 is represented with a box and an arrow, which indicates that the handset can be on-hook or off-hook. The handset and modem are in parallel in this example. The AC signal 702 flows through ADC 720 into HSP modem 724. ADC 720 samples the AC signal 702 constantly in one embodiment.

HSP modem 724 includes an on-hook/off-hook detector 726 for detecting whether the handset is on-hook or off-hook. In particular, the on-hook/off-hook detector 726 detects a change in signal power of the AC signal 702 by comparing it to the constant AC signal source.

In the case in which a constant signal source exists, let the line impedance be Zl, the modem impedance be Zm, and the handset impedance be Zh. The relationship of the power over the modem with handset on-hook, denoted Pm-on, and the power over the modem with handset off-hook, denoted Pm-off, is represented by the following equation (5):

$$Pm\text{-off} = Pm\text{-on} * ((Zl*Zh + Zm*Zh)/(Zl*Zm + Zl*Zh + Zm*Zh))^2 \quad (5)$$

For example, in the case of a V.92 dial up modem (that uses a V.92 modem protocol), assume that the line impedance, the handset impedance, and the modem impedance are all 600 ohms. From equation (5), if a handset goes off-hook while the modem is kept off-hook, the power over the modem will be decreased by 3.5 dB. Similarly, if a handset goes on-hook while the modem is kept off-hook, the power over the modem will be increased by 3.5 dB.

In another embodiment, an ADSL G.lite modem is used. In the case of a ADSL G.lite modem, assume the handset impedance is 600 ohm, and the line impedance and the modem impedance are both 100 ohms. If a handset goes off-hook while the modem is kept off-hook, the power over the modem will be reduced by 0.70 dB. Similarly, if a handset goes on-hook while the modem is kept off-hook, the power over the modem will be increased by 0.70 dB. Thus, the change of signal power technique can detect the status of a parallel-connected handset by measuring the change of signal power flowing through a modem.

The processing of the on-hook/off-hook detector when a constant signal source does not exist is illustrated in a flow chart in FIG. 8 in accordance with one embodiment of the invention. The acts of FIG. 8 are similar to the acts of FIG. 5, except that act 500 represents the on-hook/off-hook detector obtaining a measure of a constant signal, while acts 800 and 810 represent the on-hook/off-hook detector generating and obtaining a measure of an echo signal, respectively. In particular, act 800 represents the on-hook/off-hook detector generating an echo signal. Act 810 represents the on-hook/off-hook detector obtaining a measure of the echo signal power as a reference signal power, represented with "R".

The echo signal is generated at the HSP modem. In one embodiment, the echo signal is a very low frequency (e.g., 7 Hz) that cannot be heard by humans. Additionally, a low frequency signal is used because existing modems typically transmit at most a 5 K signal. In another embodiment, the echo signal may be at a frequency that may be heard by a human (e.g., one that sounds like static).

The HSP modem has a transmitter and a receiver. When the echo signal is generated, it is transmitted at the transmitter, and the echo signal is detected at the receiver. An echo always exists with a signal, and in this case the echo cancellor at the receiver is disabled. The echo signal is received only when the telephone is in use (i.e., off-hook) and the modem is off-hook. If the modem were receiving signals from a remote modem, there would be a steady signal received from the remote modem (See FIG. 7). Then, a band pass filter at the receiver is used to filter out this portion of the signal for use as a reference signal.

Act 820 represents the on-hook/off-hook detector obtaining a measure of the instantaneous signal power (represented with "P") of the line connecting the modem to another device (e.g., the telephone handset). Act 830 represents the on-hook/off-hook detector determining whether the instantaneous signal power falls outside of a range using equation (4).

If the instantaneous signal power is less than R*MIN or greater than R*MAX, the on-hook/off-hook detector continues to act 840, otherwise, the on-hook/off-hook detector continues to act 850.

Act 840 represents the on-hook/off-hook detector detecting that a device connected to the modem is off-hook. Act 850 represents the on-hook/off-hook detector detecting that a device connected to the modem is on-hook. After either act 840 or 850, the on-hook/off-hook detector loops back to act 510 and periodically measures the signal power until the modem is disconnected from the remote modem.

FIG. 9 illustrates, in a state diagram, various states of an on-hook/off-hook detector when there is no constant signal source, in accordance with one embodiment of the invention. State 900 represents an initial state in which an echo signal is generated and its signal power is measured as a reference signal power while a parallel handset is on-hook. There is a transition from state 900 to state 910 once the reference signal power is measured. State 910 represents a state in which the parallel handset is in an on-hook state, and the on-hook/off-hook detector is monitoring the signal power to determine whether there is a change in signal power with respect to the signal power for the instantaneous status, which is on-hook. If there is such a change, the on-hook/off-hook detector detects that the parallel handset is off-hook and transitions from state 910 to state 920. In state 920, the parallel handset is in an off-hook state, and the on-hook/off-hook detector is monitoring the signal power to determine whether there is a change in signal power with respect to the signal power for the instantaneous status, which is off-hook. If there is such a change, the on-hook/off-hook detector detects that the parallel handset is on-hook and transitions from state 920 to state 910.

FIG. 10 illustrates, in a schematic diagram, an AC model circuit in which a constant signal source does not exist in accordance with one embodiment of the invention. In this case, the AC signal 1020 originates from an HSP modem 1026. Transformer 1002 is connected via line 1004 to transformer 1012. The line impedance 1006 is represented by Zl, the handset impedance 1008 is represented by Zh, and the modem impedance 1010 is represented by Zm. The handset and modem are in parallel in this example. The HSP modem 1026 generates an echo signal 1022. HSP modem 1026 includes an on-hook/off-hook detector 1028 for detecting whether the handset is on-hook or off-hook. In particular, the on-hook/off-hook detector 1028 detects a change in signal power of the AC signal 1020 by comparing it to the constant echo signal 1022.

In the case in which a constant signal source does not exist, assume that a constant signal source can be sent outside voice band from a modem such that there is a constant signal coming from echo. That is, a constant signal source is transmitted from the modem's transmitter and its "echo" is received at the modem's receiver. Also assume that the echo does not interfere with the voice communication on the line. Since the echo path is used to detect signal power change, the relationship of the power over the modem with handset on-hook, denoted Pm-on, and the power over the modem with handset off-hook, denoted Pm-off, is represented by the following equation (6):

$$Pm\text{-off}=Pm\text{-on}*((Zl+Zm)/(Zl//h+Zm))^2*((Zl//h-Zm)/(Zl-Zm))^2 \quad (6)$$

In equation (6), Zl//h is a parallel impedance of a line and a handset. For example, assume that the line impedance and the handset impedance are both 600 ohms. Assume that the modem impedance is 450 ohms. If a handset goes off-hook while the modem is kept off-hook, the power over the modem will be decreased by 4.38 dB. Similarly, if a handset goes on-hook while the modem is kept off-hook, the power over the modem will be increased by 4.38 dB. In this case, the change of signal power technique emphasizes that if a handset is off-hook, power over the modem may be reduced or increased, depending on the real impedance.

In an alternative embodiment, the echo signal may be used when the modem is in use. In this case, an echo signal may be sent in an audible band. For example, a scrambled signal may be sent with a signature pattern. The modem can look for the signature pattern in the echo signal.

In yet another alternative embodiment, for a DSL modem, an echo signal may be sent in a voiceband frequency. After detecting the on-hook/off-hook status, the DSL modem adjusts upstream and downstream transmission power accordingly to make sure that the DSL signal does not create noise for the handset.

In the echo signal case, it is possible to have a status in which the on-hook and off-hook impedance match of a modem and handset is unchanged. The condition may be described with the following equation (7) in which Zl is line impedance, Zh is handset impedance, and Zm is modem impedance.

$$Zl*Zl//Zh=Zm*Zm \quad (7)$$

The modem impedance may be controlled by modem design. Therefore, it is possible to design a modem so that Zm>Zl. Then, it would not be possible to have Zl*Zl//Zh=Zm*Zm.

In one embodiment, the modem can "backoff" (i.e., shut itself down to allow use of the telephone). The V.92 standard available for purchase from the International Telecommunication Union allows the modem to place itself on "hold" for a period of time (e.g., 20 minutes) to allows us of the telephone without terminating a connection to the remote modem. In particular, if a local modem wishes to go on hold, it will notify a remote modem that it will shut down for a specified period of time. When the local modem then detects that the telephone is on-hook, the local modem is able to start up again. At this time, the local modem determines whether the remote modem is still waiting. If the remote modem is still waiting, the local and remote modems resume communication. Otherwise, the local modem will start an initialization process (such as one described in G.992.1 available for purchase from the International Telecommunication Union) to connect to the remote modem.

FIGS. 11A–11B illustrate pseudocode instructions for performing the processing of the on-hook/off-hook detector. In particular, instructions 1100 represent the on-hook/off-hook detector performing initialization. At this point, the status is set to indicate that a reference signal power is to be measured. Instruction 1102 identifies the equation for an average power calculation as: p=p*0.99f+s*S*0.01 f, with f indicating that the numbers are floating point values. This equation was discussed in more detail above.

Instructions 1104 represent the on-hook/off-hook detector obtaining a measure of a reference signal power. In particular, after 1000 signal samples are received, the reference signal is determined to be stable and is set, in this example, to the value of the measure of the instantaneous signal power.

Instructions 1106 and 1108 represent the on-hook/off-hook detector monitoring the instantaneous signal power to determine whether it has changed with respect to the reference signal power. For example, as illustrated with instructions 1106, if the instantaneous signal power falls outside of a range, then an off-hook status is detected. As illustrated with instructions 1108, if the instantaneous signal power falls within a range, then an on-hook status is detected.

Simple examples provided herein for clarity of understanding. In the real world, however, impedance is not typically just a resistor. Therefore, real world situations may be more complicated than given in the examples. In any case, the change of signal power technique detects a change in signal power to detect the handset on-hook/off-hook status change. Generally, when the handset and modem are on-hook, neither is being used. When the modem is off-hook and the handset is on-hook, the modem impedance closely matches the handset impedance. When the modem is off-hook and the handset goes off-hook, there is a detectable mismatch in the modem impedance and the handset impedance.

The on-hook/off-hook detector of the invention, which monitors an AC signal, has numerous advantages over the DC line current technique. The change of signal power technique is a software-based implementation that provides better precision than a hardware-based approach, such as the DC line current technique. The DC line current technique is implemented in hardware, and therefore changes to the technique require modifications to the hardware. On the other hand, the on-hook/off-hook detector is implemented in software, and changes to the technique (e.g., changing the equation for detecting instantaneous signal power) is simpler and less expensive than altering hardware. The DC line current technique is unable to detect small impedance mismatches (e.g., 2 mA). Also, the DC line current technique works with a constant signal. The on-hook/off-hook detector is able to work either with a constant signal or without a constant signal. Also, the change in signal power technique is based in the AC-domain, while the hardware-based approach is based in the DC-domain.

When compared to the channel response technique, the change of signal power technique is much simpler, and an optimal detection range is more easily decided because the measured signal power is a scalar variable.

Microsoft, Windows XP, Windows 2000, and Windows ME are trademarks of Microsoft, Inc. of Redmond, Wash. IBM is a trademark of International Business Machines, Corp., Armonk, N.Y. Intel, Intel386, Intel486, Intel 810, Intel 820, and are trademarks of Intel, Corp., Santa Clara, Calif. Via™ 686A is a trademark of Via Technologies Inc., Fremont, Calif. SiS™ 540 or 630 is a trademark of Silicon Integrated Systems, Corp., Sunnyvale, Calif. Linux® is a trademark of Linus Torvalds.

Although the invention has been described with reference to particular embodiments, the description is only an example of the invention's application and should not be taken as a limitation. In particular, even though much of preceding discussion was aimed at telephones connected to modems via telephone lines, the technique of the invention is applicable to other communication devices that share a transmission medium (e.g., telephone line), such as facsimile machines connected to telephones. Also, the computer may be any type of computing device, such as an appliance, a personal digital assistant (PDA), laptop, or mainframe computer.

Generally, the software of the invention is tangibly embodied in a computer-readable device or media, such as memory, data storage devices, and/or data communication devices, thereby making a product or article of manufacture according to the invention. As such, the terms "article of manufacture" and "computer program product" and "computer-readable storage medium" as used herein are intended to encompass software accessible from any computer readable device or media. The software may be loaded from memory, data storage devices, and/or data communication devices into the memory of the computer for use during operations.

Various other adaptations and combinations of features of the embodiments disclosed are within the scope defined by the following claims.

We claim:

1. A process for operating a first communication device, comprising:
   obtaining a measure of a reference signal power of a communication medium;
   obtaining a measure of an instantaneous signal power of the communication medium;
   comparing the measure of the instantaneous signal power to a range that is determined based on the measure of the reference signal power; and
   detecting the status of a second communication device connected to the communication medium based on the comparison.

2. The process of claim 1, wherein the first communication device comprises a modem.

3. The process of claim 1, wherein the second communication device comprises a telephone handset.

4. The process of claim 1, wherein the status reflects whether the second communication device connected to the communication medium is on-hook or off-hook.

5. The process of claim 1, wherein the instantaneous signal power and the reference signal power are determined based on an alternating current.

6. The process of claim 1, further comprising:
   comparing the detected status to a previous status of the second communication device; and
   determining whether there has been a chance of status for the second communication device based on the comparison.

7. The process of claim 1, further comprising;
   generating an echo signal, wherein the measure of the reference signal power is obtained based on the echo signal.

8. A method of detecting a change of status for a device connected to a telephone line, comprising:
   obtaining a measure of a reference signal power of the telephone line;
   obtaining a measure of an instantaneous signal power of the telephone line;
   comparing the measures of the reference signal power and the instantaneous signal power, and
   detecting that there has been a change in status of the device connected to the telephone line based on the comparison.

9. The method of claim 8, wherein the status reflects whether the device connected to the telephone line is on-book or off-hook.

10. The method of claim 8, wherein the signal power is determined based on an alternating current.

11. The method of claim 8, further comprising generating an echo signal and wherein the measure of the reference signal power is obtained based on the echo signal.

12. A method of detecting a change of status for a device connected to a telephone line, comprising:
generating an echo signal;
obtaining a measure of an echo signal power of the echo signal;
obtaining a measure of an instantaneous signal power of the telephone line; and
detecting the status of the device connected to the telephone line based on whether the measured instantaneous signal power falls within a range that is set based on a value of the echo signal power.

13. The method of claim 12, wherein the status reflects whether the device connected to the telephone line is on-hook or off-hook.

14. The method of claim 12, wherein the instantaneous signal power is determined based on an alternating current.

15. A process for communicating over a communication medium, comprising:
monitoring a change in a signal power of the communication medium connecting a first communication device to a second communication device as compared to a reference signal power;
determining that there is a change in the signal power; and
detecting that the second communication device has changed status.

16. The process of claim 15, wherein the change in status results in the second communication device being off-hook.

17. The process of claim 15, wherein change in status results in the second communication device being on-hook.

18. A communication system, comprising:
a communication medium;
a first communication device coupled to the communication medium;
a second communication device coupled to the communication medium; and
a digital signal processor with an on-hook/off-hook detector in the first communication device, wherein the on-hook/off-hook detector includes a means for detecting a status of the second communication device by comparing a measure of an instantaneous power of the communication medium to a range that is based on a measure of a reference signal power of the communication medium.

19. The system of claim 18, wherein the status reflects whether the second communication device is on-hook or off-hook.

20. The system of claim 18, wherein the first communication device comprises a modem and the second communication device comprises a telephone handset.

21. The system of claim 18, further comprising:
an alternating current signal traveling on the communication medium.

22. A communication system, comprising:
a communication medium;
a first communication device coupled to the communication medium;
a second communication device coupled to the communication medium; and
a detector for detecting a change in status of the second communication device, wherein the change in status of the second communication includes a comparison of a measure of an instantaneous power of the communication medium to a range that is based on a measure of a reference signal power of the communication medium and reflects whether the second communication device is on-hook or off-hook.

23. A computer-readable storage medium storing a computer program executable by one or more computers, the computer program comprising computer instructions for:
obtaining a measure of a reference signal power;
obtaining a measure of an instantaneous signal power of the telephone line;
comparing the measured signal power and reference signal power; and
detecting a status of the device connected to the telephone line based on the comparison.

24. The computer-readable storage medium of claim 23, further comprising generating all echo signal and wherein the reference signal power is determined based on the echo signal.

25. A system, comprising:
a first communication device coupled to a communication medium;
a second communication device coupled to the communication medium;
a computer having a processor and coupled to the first communication device; and
a memory coupled to said processor and encoded with a first group of storage elements containing one or more samples of a reference signal of the communication medium, a second group of storage elements containing one or more samples of an instantaneous signal of the communication medium, and instructions for determining a status of the second communication device by comparing a second value from the second group of storage elements to a range that is based on a fit value from the first group of storage elements.

26. The system of claim 25, wherein the memory further comprises an operating system and an application.

27. The system of claim 25, wherein the processor is a central processing unit.

28. The system of claim 25, wherein the processor is a digital signal processor.

29. A computer-readable storage medium storing a computer program executable by one or more computers, the computer program comprising computer instructions for:
obtaining a measure of a reference signal power of a communication line;
monitoring a change in a measure of an instantaneous signal power as compared to the reference signal power; and
when it is determined that there is a change in the measure of the instantaneous signal power relative to an instantaneous status of a device, detecting that the device connected to the communication line has moved to a new status.

30. The computer-readable storage medium of claim 29, wherein the status reflects whether the device connected to the communication line is on-hook or off-hook.

31. The computer-readable storage medium of claim 29, wherein the signal power is determined as a function of an amplitude of an alternating current.

* * * * *